United States Patent [19]

Stroobants

[11] 3,916,740
[45] Nov. 4, 1975

[54] CAN TRIMMING APPARATUS
[76] Inventor: Alphonse Stroobants, Rte. 1, Forest, Va. 24502
[22] Filed: Feb. 28, 1975
[21] Appl. No.: 554,329

Related U.S. Application Data
[62] Division of Ser. No. 492,860, July 29, 1974.

[52] U.S. Cl. .................................................. 82/56
[51] Int. Cl.$^2$ ........................................ B23B 5/14
[58] Field of Search ..................... 82/56–58, 46–48, 82/86

[56] References Cited
UNITED STATES PATENTS

| | | | |
|---|---|---|---|
| 2,298,366 | 10/1942 | Gladfelter et al. | 82/56 |
| 2,583,521 | 1/1952 | Temple | 82/86 |
| 3,659,486 | 5/1972 | Criss et al. | 82/48 |
| 3,756,103 | 9/1973 | Cvacho et al. | 82/47 |

Primary Examiner—Leonidas Vlachos
Attorney, Agent, or Firm—Mason, Fenwick & Lawrence

[57] ABSTRACT

A can end trimmer is disclosed including a main frame, a main rotary shaft mounted for rotation on the main frame and a plurality of self-contained cutter unit assemblies detachably connectable to the main shaft. Each cutter unit assembly includes first and second rotary cutter knives having circular cutting edges with one knife being mounted for movement between a first position having its cutting edge spaced from the cutting edge of the other knife and a second position having its cutting edge overlying the cutting edge of the other knife. A rotary vacuum chuck is mounted for cam controlled reciprocation toward and away from the cutter members for positioning a can end over the movable rotary knife when the knife is in its first or open position, subsequent closure of the knife trims the can end and subsequent opening of the knife permits the holder to retract the finished can from the cutting position; a unique stripper ring discharges the scrap ring to a separate receiving area. Finger discs mounted on the main shaft provide unique work handling functions for removing unfinished cans from an infeed means and positioning the cans for engagement by the vacuum chuck and for aiding in discharge of finished cans to an outfeed means. Control means for the cutter unit is supported by the main shaft or frame and the entire cutter unit can be removed for maintenance or placement with minimum difficulty. Another embodiment of the invention employs a central cutter knife and planetary cutter knives movable to overlying relation with respect to a cutting edge of the central knife for effecting the trimming of can ends positioned over the planetary knife members by automatic handling means similar to that of the first embodiment.

2 Claims, 19 Drawing Figures

CAN TRIMMING APPARATUS

This is a division of application Ser. No. 492,860, filed July 29, 1974.

BACKGROUND OF THE INVENTION

The present invention is in the field of cutting and trimming apparatus and is particularly directed to an improved apparatus for trimming the ends of cylindrical work pieces such as cans.

In the manufacture of metal cans, it is conventional practice to form an unfinished can or container of cylindrical configuration consisting of a bottom and a cylindrical side wall which is open on the top end. Such unfinished can members can be formed by a variety of processes such as drawing and ironing to provide the unfinished container. Subsequent to the formation of the unfinished container, it is necessary to trim the upper end of the container to achieve a container of a fixed desired height and having a smooth upper edge termination. It is essential that the upper edge termination of such containers be essentially flawless since the upper edge is subsequently subjected to an outward flanging process for enabling the connection of a top to the container. Any burrs, cracks or the like can prevent obtainment of a good seal between the top and the can in the flange area.

Numerous devices have evolved for the purpose of trimming the ends of unfinished containers. However, all of the presently known devices employed in trimming can ends suffer from a number of deficiencies for which adequate solutions have never been previously advanced. For example, some prior art devices have initially positioned the unfinished can on a mandril for cutting by an external cutter moved inwardly into engagement with the outer surface of the can and traversed about the periphery of the can for effecting the cutting of the can end. Substantial problems are encountered with devices of this type due to the fact that the cutting operation frequently results in burrs, cracks or other imperfections in the upper edge portion of the container wall which are enlarged during the subsequent flanging of the can ends prior to application of a top to the can body.

Various other devices have evolved in an effort to achieve a more perfect can trimming operation such as devices employing a circular knife member having an inner cutting edge with the can being positioned inside the knife member followed by the subsequent positioning of an internal knife inside the can which is then moved outwardly to effect a cutting operation with the external periphery of the knife member. Devices of this type are frequently complicated and the exact positioning of the knife members is of critical importance if a satisfactory cut is to be achieved.

A primary problem with many of the prior art devices resides in the fact that the cutter members, which are the heart of every cutting machine, are integrally built into the machine and any failure of any part of the cutter means requires a time consuming disassembly of substantial portions of the machine resulting in undesirably long periods of down time for such machines.

Probably the greatest drawback of the prior known devices is that the cutting members or knives require time consuming adjustment and alignment procedures and the knives are frequently damaged due to misalignment or misadjustment.

Another deficiency shared by the prior art machines is that they are frequently extremely complicated due to the complex plural-stepped positioning of the can members prior to, during and after a cutting operation. Not only does such complexity increase the initial cost of the machine, it also increases maintenance expense and down time to the detriment of the owner.

The subject invention provides a reliable and trouble-free can trimmer device which is relatively simple in construction, operation and maintenance. All parts of the mounting, driving and actuation functions for the cutter units are part of a removable unit that can be easily removed from the machine for maintenance and adjustment. While one cutter unit is being worked upon, another unit can be positioned on the machine in less than a minute so that there is no substantial down time for the particular machine.

Another extremely significant achievement of the present invention resides in the fact that the unique removable cutter units enable a sharpening of the rotary cutter members and replacement in an exact position with respect to each other without any necessity for time consuming adjustment in the machine. The accurate positioning of the cutter members enables the cutter members to be operating for much longer periods of time without making imperfect cuts.

SUMMARY OF THE INVENTION

Therefore, it is the primary object of this invention to provide a new and improved apparatus for trimming can ends.

Achievement of the foregoing object is enabled in the preferred embodiment by the provision of a main rotary shaft extending horizontally between bearing supports with first and second cutter units being positioned on the shaft in a manner which enables an easy removal and replacement of the cutter units in the event of any malfunction. Each cutter unit includes a pair of shafts geared together and each supporting a rotary cutter knife on an outer end externally of the frame of the cutter unit. One of the knife shafts is mounted for movement with respect to the other on a limited arcuate path so that the cutter knives can be moved between one position in which their peripheries overlie each other and an open position in which their peripheries are spaced apart to enable the insertion or removal of a can member. When a can is inserted over the cutter members, one cutter knife is received inside the can and the other is received externally of the can.

Each cutter unit includes a cutter knife actuator positioned adjacent an actuator pin timingly reciprocated by a cam follower during rotation of the main shaft. Oscillation of the cutter actuator arm serves to move one of the cutter knives into the cutting position overlying the other knife at desired time intervals during a cycle of operation. In one embodiment, the knife members are removable, relatively thin discs having either single or double cutting edges. Additionally, each cutter unit includes a power input gear engageable with the internal teeth of a ring gear encircling the main shaft and rotating with respect to the main shaft so that the cutter members are drivingly rotated. However, the cutter units can be removed from the main shaft by simply removing three threaded bolt or pin members and a lifting of the unit from the main shaft. A new cutter unit can then be repositioned on the main shaft in a very short time and operation of the device resumed while the initially removed cutter unit is repaired or adjusted as required by the particular circumstance of its removal.

Another feature of each cutter unit resides in the provision of a plurality of can positioning pins positioned about one of the cutter knives and extending forwardly axially parallel to the shaft on which that knife is mounted. Unfinished cans are moved forwardly by a vacuum chuck over the positioning pins all of which are received on the interior surface of the open end of the can. A stripper ring is mounted for reciprocation on the positioning pins and the ring is moved toward the outer end of the positioning pins following a cutting operation to remove the scrap rings from the pin to be discharged into a scrap receiving chute.

Inward and outward movement of a vacuum chuck receiving unfinished cans from an infeed conveyor is provided by a radial flange type cam by first and second cam followers on the sides of the radial flange with one of the cam followers having a surface with a substantial coefficient of friction so that the cam follower is driven by frictional engagement with the side of the cam. Rotational drive from the cam follower is provided to the vacuum chuck so that the chuck is continuously rotated. It is of some importance that the same cam that provides for reciprocation of the chuck toward and away from the cutting knives also provides the rotational drive of the chuck.

Reciprocation of the vacuum chuck results in connection of the chuck to a source of vacuum at desired portions of each rotation of the main shaft and subsequent disconnection to permit discharge of a completed or finished can member into an outfeed conveyor.

In a second embodiment of the invention, the cutting operation is effected by a main central rotary cutter knife and orbiting planetary cutter members simultaneously cooperating with the main cutter member. The orbiting cutters are reciprocated radially with respect to the main cutter and can ends are positioned between the main cutter knife and the orbiting knife surrounding the orbiting knife by handling means similar to that discussed previously with respect to the first embodiment. The orbiting knife is then moved inwardly so that its cutting edge overlies the cutting edge of the main knife as the entire assembly is rotated through a substantial arcuate path. Rotation of the cutting knives serves to trim the scrap ring from the end of the containers which are then removed from the cutting position subsequent to opening of the knife members and are discharged into an outfeed conveyor. In the second embodiment, only three cutter members are employed for providing two cutting stations due to the cooperation of the main cutter with both of the planetary cutter knife members.

A better understanding of the subject invention will be enabled when the following written description is read in conjunction with the appended drawings which will now be described.

DESCRIPTION OF THE PREFERRED EMBODIMENT

Figure 1:
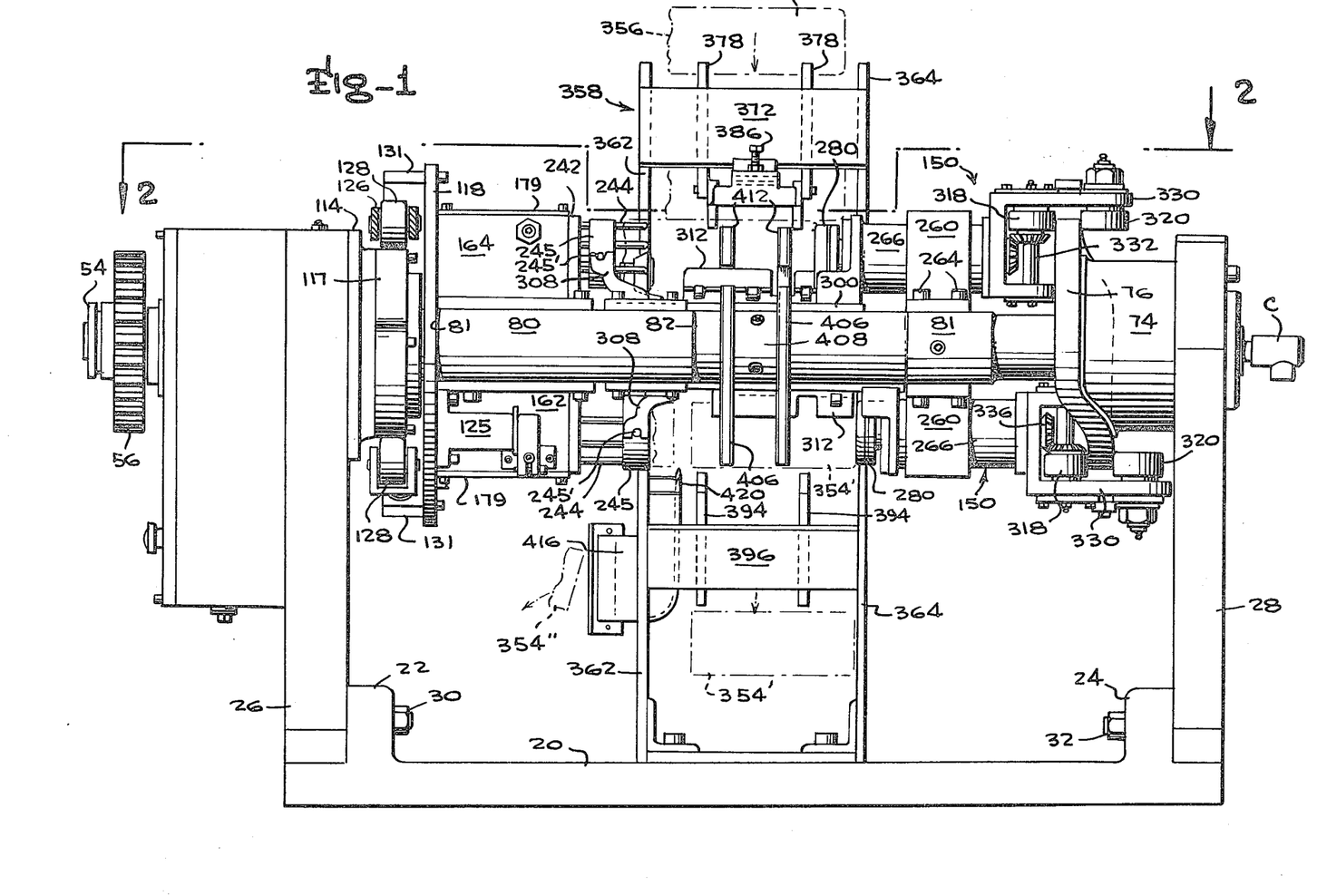
FIG. 1 is a front elevation view of the preferred embodiment of the invention.
Figure 2:
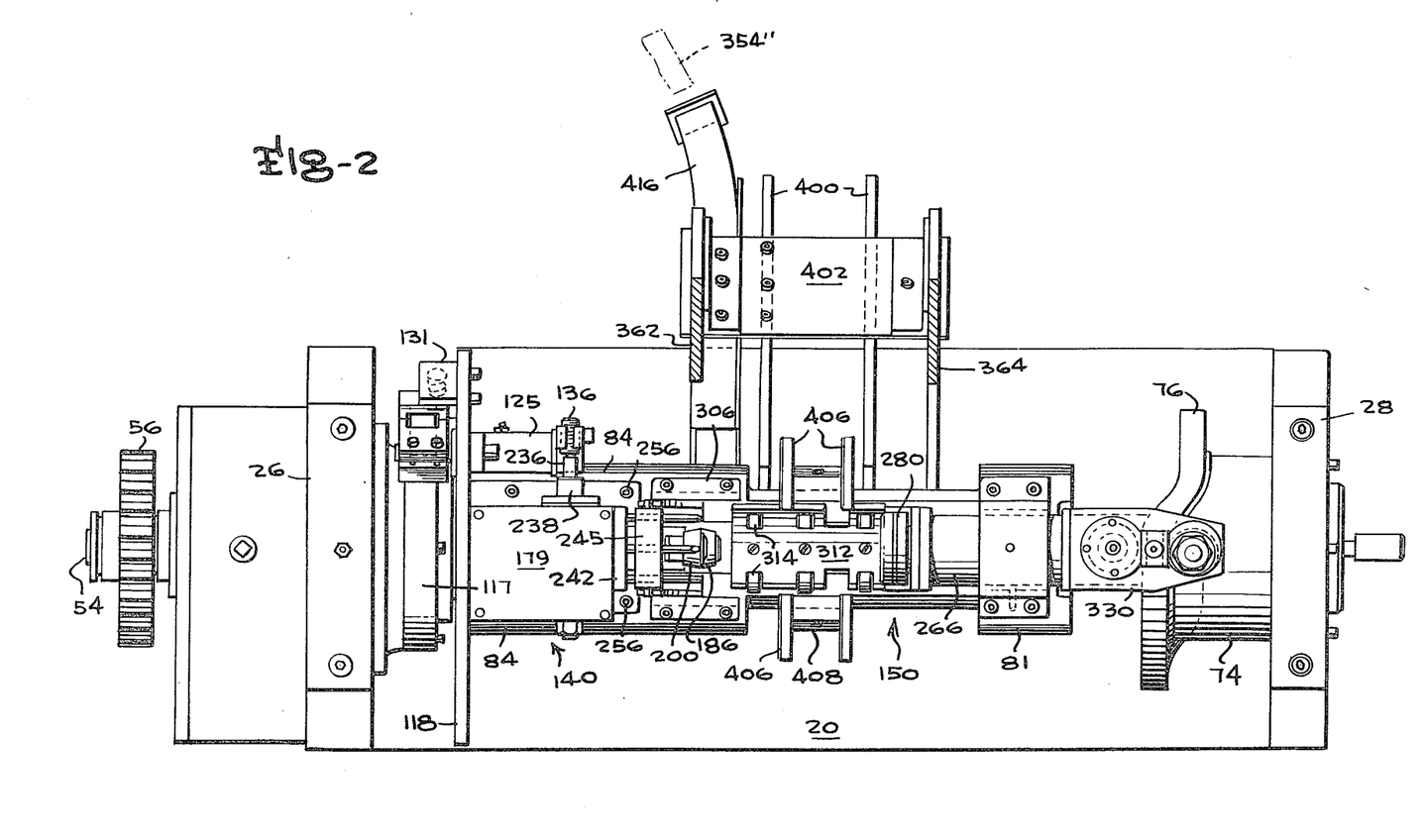
FIG. 2 is a sectional view taken along lines 2—2 of FIG. 1.
Figure 3:
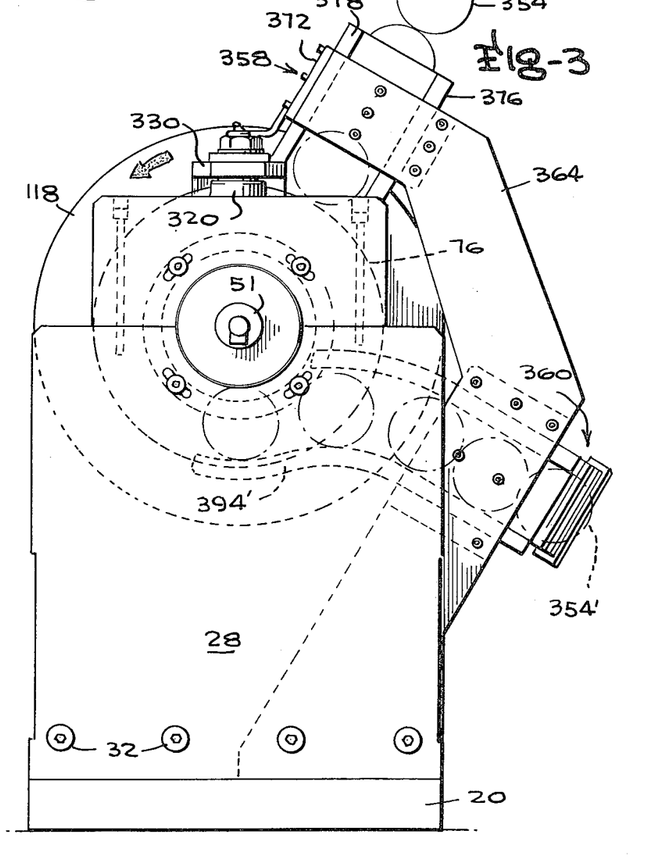
FIG. 3 is an end elevation view of the preferred embodiment.

Attention is initially invited to FIG. 1 which illustrates a preferred embodiment of the invention which comprises a main support frame formed of a base or pillar plate 20 having vertically extending connector flanges 22 and 24 extending upwardly from its upper surface. A first vertical support pillar plate 26 is connected to the vertical connector flange 22 and a second vertical support pillar plate 28 is fixedly connected to the second vertical connector flange 24 by nut and bolt members 30 and 32 respectively. All of the operative components of the preferred embodiment are supported between the first and second vertical support pillar plates 26 and 28 by rotary bearing means 30 (FIG. 4A) mounted in first vertical support pillar plate 26 and rotary bearing means 32 mounted in the second vertical support pillar plate 28 (FIG. 4B).

A main rotary generally cylindrical sleeve 36 is supported by rotary bearing members 30 for rotation and a sleeve drive gear 38 is fixedly connected to the end of the main rotary sleeve 36 for providing input drive to the sleeve in a manner and for purposes that will become apparent hereinafter. Additionally, the other or opposite end of sleeve 36 is provided with a ring gear 40 fixed to sleeve 36 by threaded pin bolts 41. Ring gear 40 has a continuous circular array of inwardly facing teeth which provide an output for a cutter unit to be described hereinafter.

Figure 4A:
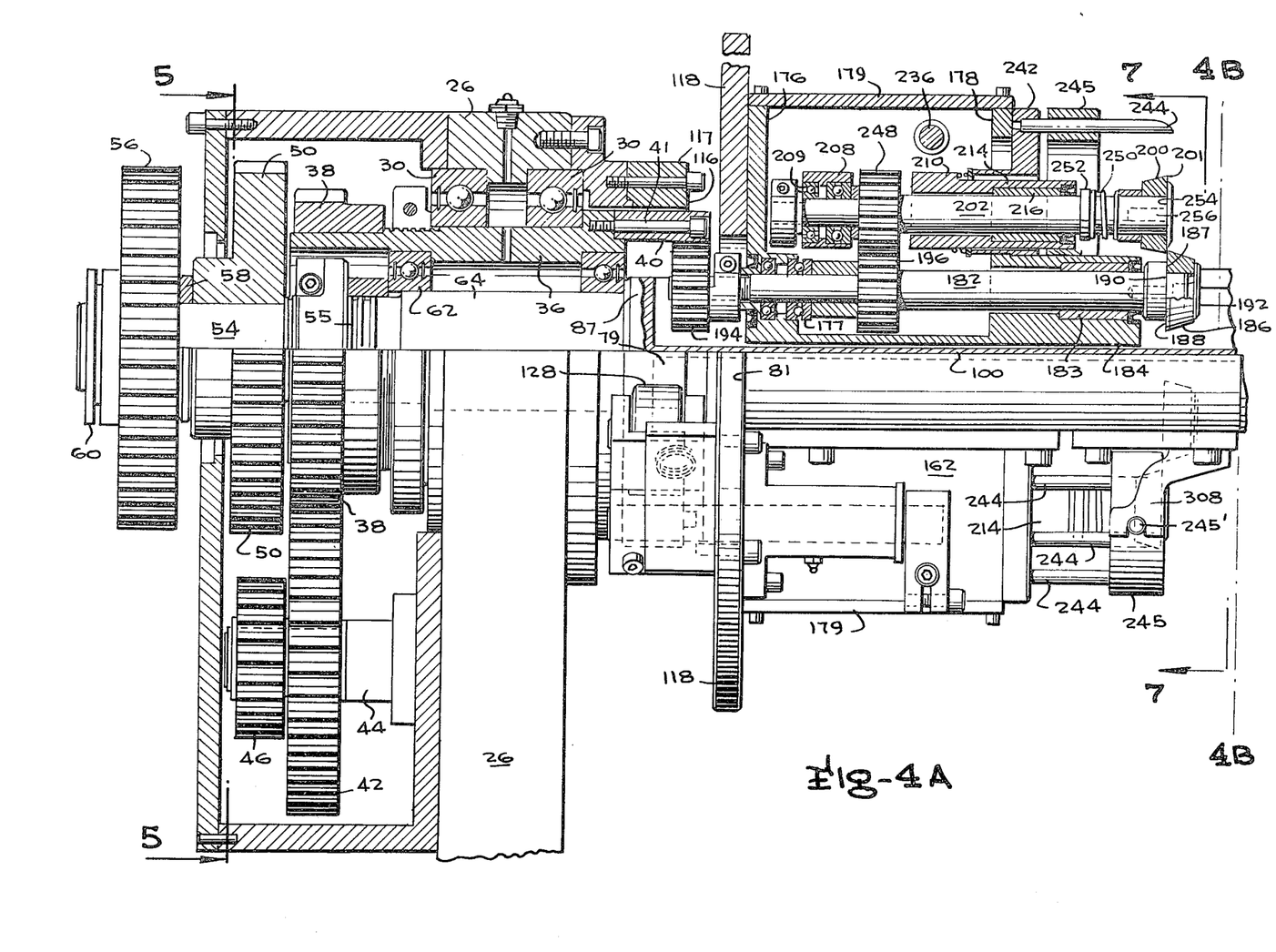
FIG. 4A is a longitudinal section with parts broken away for clarity of one end portion of the preferred embodiment which joins FIG. 4B at line 4A.
Figure 4B:
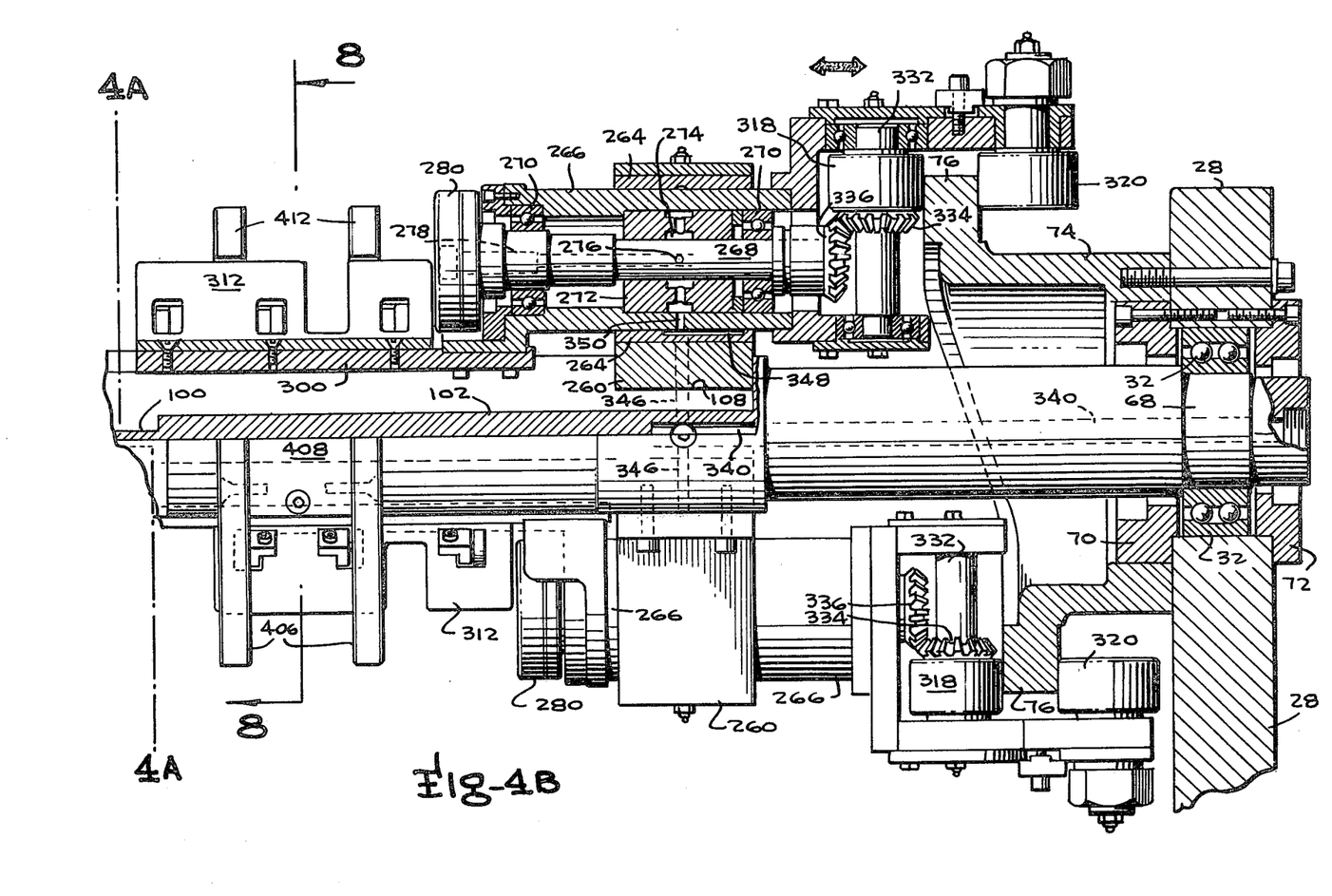
FIG. 4B is a longitudinal section with parts removed of the remaining portions of the preferred embodiment extending from line 4B of FIG. 4A.
Figure 5:
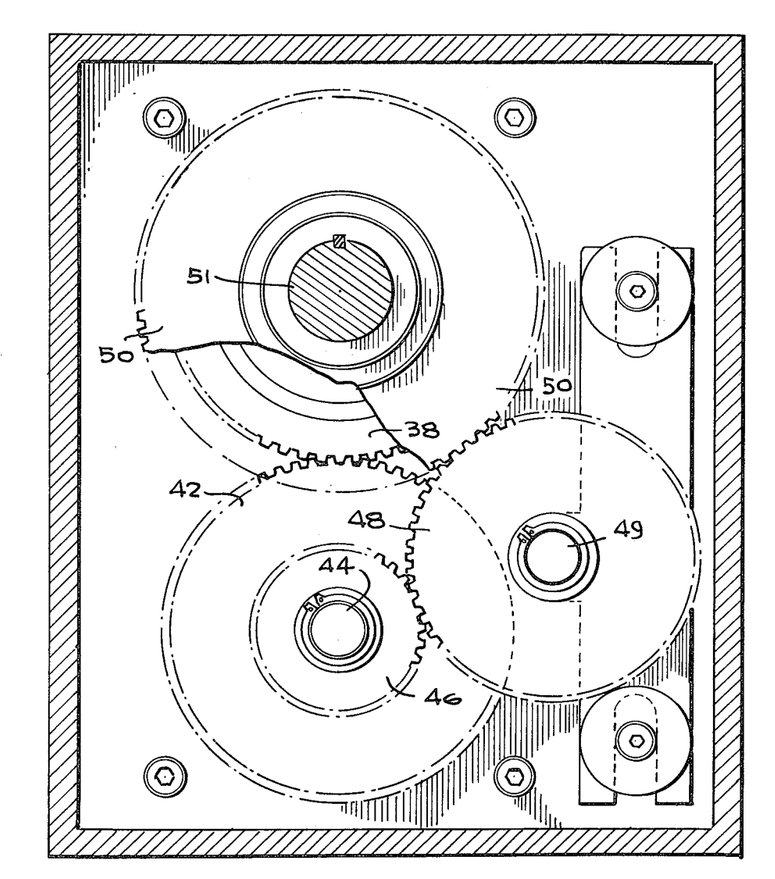
FIG. 5 is a sectional view taken along lines 5—5 of FIG. 4A.

Rotation of the main rotary sleeve 36 is effected through gear means best illustrated in FIG. 4A and FIG. 5 including an idler gear 42 meshing with gear 38 and coaxially mounted for unitary rotation on support means 44 with a smaller coaxial gear 46. Gear 46 meshes with an idler gear 48 (FIG. 5) which also meshes with a primary shaft drive gear 50 keyed to the end of a main shaft 51 (FIG. 6) on a cylindrical end portion 54 of the main shaft with a threaded shaft portion 55 being immediately inward of end portion 54. Additionally, a main power input gear 56 is also keyed to the main shaft 51 on the cylindrical end portion 54 with a separator ring 58 providing proper spacing between the two gear members 50 and 56 and with a conventional retainer means 60 maintaining the gear 56 on the end of the shaft in an obvious manner.

It should be noted that rotation of the main input gear 56 in a clockwise direction will result in rotation of the main shaft 51 in a clockwise direction; however, the main rotary sleeve 36 will rotate in a counter-clockwise direction. The relative rotation between the main sleeve 36 and the main shaft 51 is enabled by virtue of the fact that the only connection between the main sleeve and the main shaft is by rotary bearing means 62 (FIG. 4A) externally engaging the interior of the sleeve 36 and internally engaging the cylindrical portion 64 of the main shaft 51.

Support for the end of main shaft 51 opposite the end to which the main power input gear 56 is connected is provided by the rotary bearing means 32 mounted in the second vertical support pillar plate 28 and engaging a cylindrical bearing section 66 of the main shaft as best shown in FIG. 4B. Bearing retainer rings 70 and 72 are provided on opposite sides of the second vertical pillar plate 28 for retaining bearing 32 in position as best illustrated in FIG. 4B. Additionally, a fixed cylindrical work piece positioning control cam 74 having a radial cam flange 76 is bolted to the vertical pillar plate 28.

Main shaft 51 includes a gear and cam mounting oblate portion 79, relatively large diameter cutter unit mounting portion 80 and a similar large diameter work piece feed holder mounting portion 81 with a central smaller diameter section 82 being provided between the portions 80 and 81. The upper extent of the shaft as viewed in FIG. 6 is defined by planar surface 84 and a longitudinally extending recess, generally designated 86, extends downwardly from the planar surface 84 and enables the mounting of various components on the main shaft for purposes to be discussed.

Figure 6:
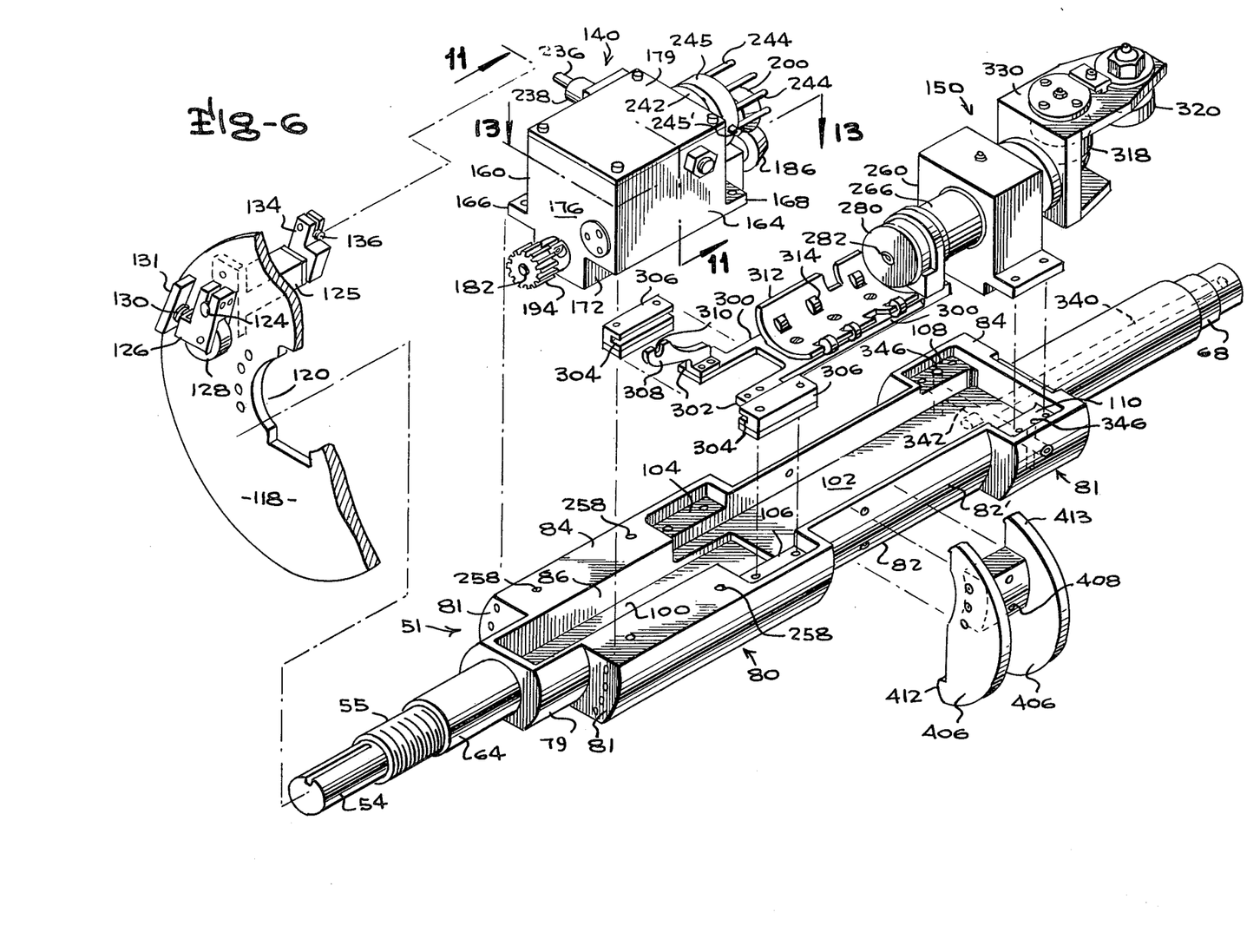
FIG. 6 is an exploded perspective view of the primary operative components of the preferred embodiment.

It should be understood that the main shaft 51 is symmetrical about a horizontal plane passing through its axis so that the shaft 51, if rotated 180°, would have the same exact appearance as the shaft as illustrated in FIG. 6. Moreover, the main shaft 51 is also symmetrical with respect to a vertical plane through the axis of the shaft.

A center web or floor 100 extends substantially the entire length of the relatively large diameter cutter unit mounting portion 80. A thicker center floor web 102 is provided in the central portion 82 and the work piece feed holder mounting portion 81 for defining the inner extent of the longitudinally extending recess 86. Additionally, slide bearing mounting shoulders 104 and 106 are provided on each side of the recess 86 in the end of the cutter unit mounting portion 80 adjacent the central portion 82 and similar planar mounting shoulders 108 and 110 are provided at the extreme end of the work piece mounting portion 81; a relatively long cylindrical shaft section extends between the portion 81 and the smaller cylindrical bearing portion 68.

A cam mounting fitting plate 114 is affixed to the inner surface of the first vertical support pillar plate 26 and a cutter control cam 116 having an outer peripheral cam surface 117 is mounted on the cam fitting plate 114 as best illustrated in FIGS. 1 and 4A. A cam follower support flange 118 radially extending from main shaft 51 (FIG. 6) has a central aperture 120 matingly fitted over the oblate portion 79 of the main shaft to which it is fixedly connected by bolts or threaded pins received in the end wall 81 of the relatively large diameter cutter unit portion 80. A pivot shaft 124 is mounted to transversely extend through the radial cam follower support flange 118 and a bore in a bracket 125 fixed to flange 118. A cam follower support arm 126 is mounted on the end of the pivot shaft 124 and supports a cam follower roller 128 normally biassed toward the cam surface 117 by compression spring means 130 extending between support arm 126 and a lug 131 fixed to support flange 118. Cam follower roller 128 is in radial alignment with the outer periphery of the cutter control cam 116 and travels about the cam surface 117 as the support flange 118 rotates with the main shaft 51. Cam surface 117 is contoured so as to oscillatingly pivot support arm 126 and shaft 124 for providing pivotal movement of a cutter actuator arm 132 fixedly connected to the end of shaft 124 opposite cam follower support arm 126 as best illustrated in FIG. 6. A threaded adjustable abutment lug 136 is adjustably mounted in the upper end of the cutter actuator arm 132 so as to be radially adjustable for a purpose to be discussed hereinafter.

Figure 7:
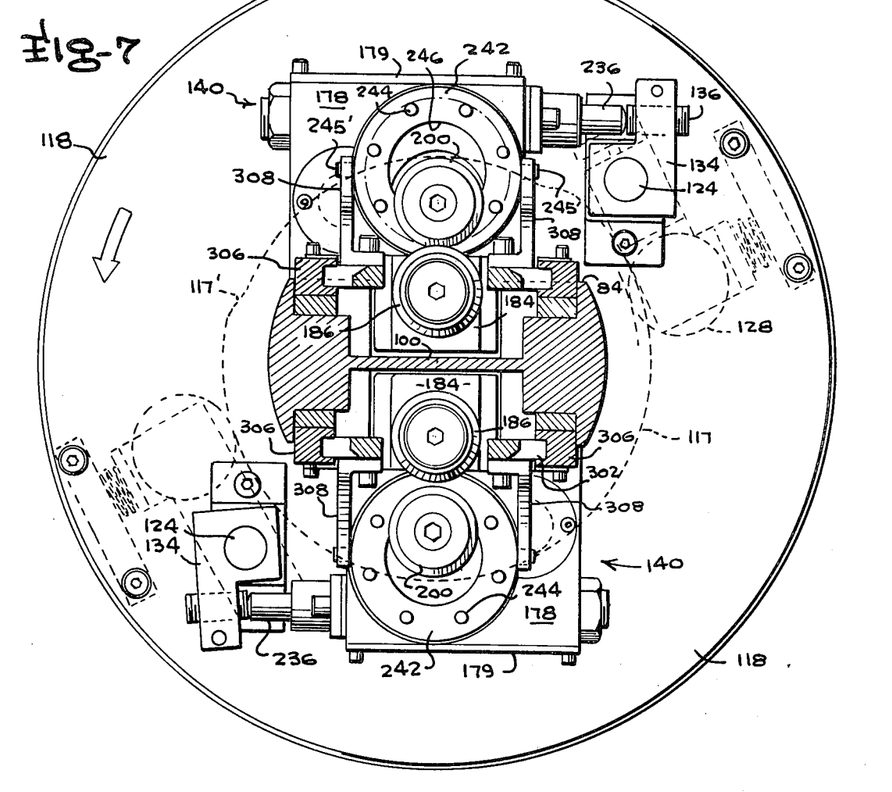
FIG. 7 is a sectional view taken along lines 7—7 of FIG. 4A.

In the preferred embodiment, two identical removable cutting units, each generally designated 140, are mounted on the main shaft 51 on diametrically opposite sides of the main shaft as will be apparent from inspection of FIGS. 1 and 7.

Additionally, two work piece handling units, generally designated 150, are mounted on diametrically opposite sides of the main shaft 51 with each of the work piece handling units 150 being associated with one of the removable cutter units 140 for receiving raw work pieces 354, moving the raw work pieces into position to have one end trimmed therefrom by the cutter unit and subsequently removing the trimmed work piece 354' for discharge from the apparatus.

Each of the removable cutter units includes a rigid box-frame 160 the main elements of which include first and second side walls 162 and 164 (FIGS. 11 and 12), first and second foot plates 166 and 168 separated by a downwardly extending rectangular channel comprising vertical side plates 170 and 172 and a bottom plate 174. The ends of the box-frame 160 comprise a first end wall 176 and second end wall 178. A cap plate 179 connected to the top edges of side walls 162 and 164 and end walls 176 and 178 completes the box-frame 160.

Box-frame 160 provides support for a number of internal components including a first cutter shaft 182 (FIG. 4A) supported for rotation by roller bearings 177 in the end wall 176 and a sleeve bearing 183 in rectangular block lug 184 extending outwardly from the second end wall 178. A first rotary cutter member 186 having a circular cutting edge 187 is keyed for rotation on the shaft 182 and has an inner radial face 188 in abutting engagement with a radial positioning flange 190 of shaft 182 near the end of the shaft 182. Rotary cutter 186 is held in position on the end of the shaft by retainer means 192. A cutter drive input gear 194 is keyed to the outer end of shaft 182 externally of box-frame 160 and a gear 196 is keyed to shaft 182 on the interior of the box-frame 160 in a position best illustrated in FIG. 4A.

A second rotary cutter knife 200 having a circular cutting edge 201 is mounted on the end of a second cutter shaft 202 supported for rotation by a rocker block 204 (FIG. 14) positioned within the confines of the box-frame 160. Rocker block 204 is mounted for pivotal movement on a pivot shaft 206 extending between the end walls 176 and 178 of the box-frame 160. Rocker block 204 includes first and second leg portions 208 and 210 joined by a base portion 212 through which the pivot shaft 206 extends. Leg portion 208 is apertured to provide support for roller bearings 209 supporting one end of the second cutter shaft 202 and a cylindrical extension 214 extending perpendicularly from the side of second leg 210 includes a sleeve bearing 216 supporting the other end of the second cutter shaft 202 as best illustrated in FIG. 4A. Additionally, a vertical lug 218 extends upwardly from the corner of the rocker block 204 and includes an aperture 220 in which a coil compression spring 230 is positioned between lug 218 and wall 164 for urging the rocker block in a counter-clockwise direction as viewed in FIG. 12.

A wear plate 232 (FIG. 13) is provided in a depression aligned with the spring 230 in alignment with a low-friction roller 234 mounted in the end of a push rod 236. Push rod 236 is supported in a slide bearing 238 mounted in an aperture in the side wall 162 and includes a positioning flange 239 abutting against the end of the slide bearing 238. The force of spring 230 urges push rod 236 to the left as viewed in FIGS. 11 and 12 in an obvious manner. The outer end of the push rod 236 is rounded as at 240 for low-friction engagement with the end of abutment lug 136 as shown in FIG. 7.

A generally circular fitting plate 242 is attached to the external surface of the end wall 178 coaxially with respect to an opening in the wall and a plurality of work piece positioning pins 244 extend outwardly from the fitting plate 242 and a stripper ring 245 having diametrically opposed radial actuator pins 245' is mounted for reciprocation on pins 244. Pins 244 are received on the interior of the open end of a cylindrical work piece in a manner and for a purpose to be discussed in detail hereinafter.

Figure 11:
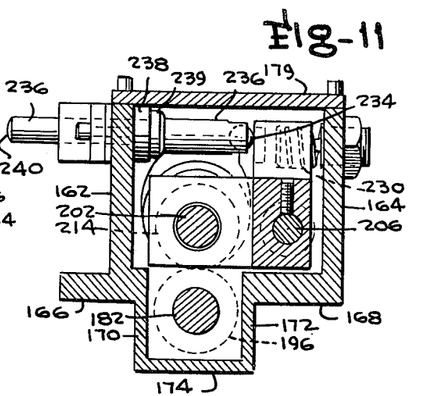
FIG. 11 is a sectional view taken along lines 11—11 of FIG. 6 illustrating the can end rotary cutter knives in a closed condition.
Figure 12:
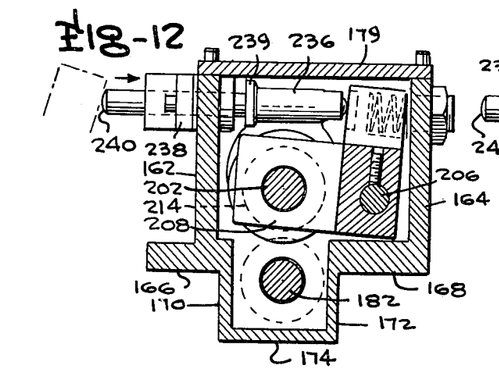
FIG. 12 is a sectional view similar to FIG. 11 but illustrating the can end rotary cutter knives in an open non-cutting position.
Figure 13:
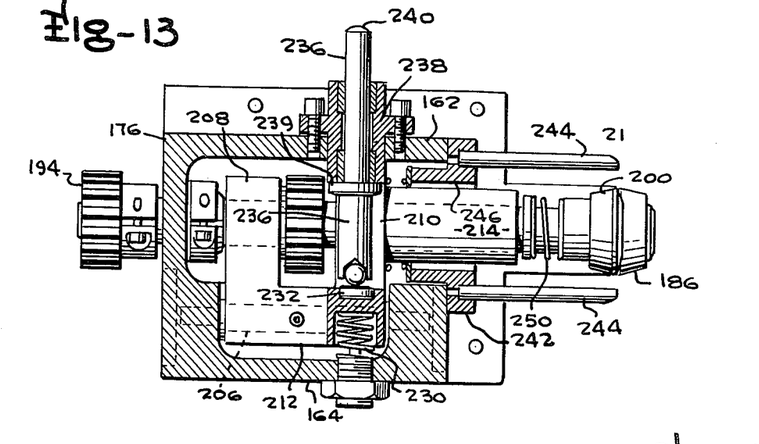
FIG. 13 is a sectional view taken along lines 13—13 of FIG. 6.

It should be noted that the fitting plate 242 is provided with an aperture 246 through which the cylindrical bearing support extension 214 of rocker block 204 extends with the aperture 246 being of larger size than the outer periphery of the cylindrical bearing support extension 214 to permit pivotal movement of the cylindrical extension 214 within the aperture between the limit positions illustrated in FIGS. 11 and 12.

The removable cutter units 140 are positioned on the main shaft 51 with the lower surfaces of foot plates 166 and 168 resting on the planar upper surface 84 and the vertical side plates 170 and 172 extending downwardly into the longitudinal recess 86 above the center floor web 100. Machine screws or other equivalent members hold the cutter units fixedly in position on the main shaft.

A gear 248 is keyed to shaft 202 to mesh with the gear 196 so that driving rotation is imparted to shaft 202 via ring gear 40, gear 194 and gear 196 as shaft 51 rotates with respect to main rotary sleeve 36 in a manner that will be obvious from inspection of FIG. 4A. The second rotary cutter knife 200 is urged axially outwardly by a compression spring 250 against a radial abutment surface 254 of a retainer 256 threadably received in the end of the shaft 202. Surface 254 engages and is consequently accurately positioned by the end of the shaft 202 and so as to achieve an exact positioning of the knife member 200 both with respect to the shaft 202 and the first rotary cutter knife 186 which is positioned against the radial surface of the positioning flange 190 on shaft 182. Consequently, an exact positioning of the knife members with respect to each other is enabled in the cutter unit per se. It is of great advantage that the entire cutter unit can be removed from the machine in the event of any malfunction of any part of the cutter unit and replaced in an expeditious manner without any substantial disassembly of any parts of the cutter support or drive components.

More specifically, each cutter unit 140 is positioned with the lower surface of the foot plate 166 and 168 resting on planar surface 84 and the elements between the vertical side plates 170 and 172 extending downwardly in the longitudinal slots 86 above the floot plate 100. As thus positioned, the cutter units 140 are held in position by threaded bolts or pins 256 received in apertures 258 in the main shaft 51. As thus positioned on the main shaft 51, the cutter unit drive gear 194 is in mesh with the ring gear 40 and rotation of the main shaft 51 consequently results in rotation of the cutter knives 186 and 200 via shaft 182, gear 196, gear 248 and shaft 202 in a manner that will become apparent from inspection of FIG. 4A. It should also be noted that the rounded end 240 of the push rod 236 is positioned in engagement with the adjustable abutment lug 136 on the cutter actuator arm 134. Consequently, rotation of the shaft 51, radial cam follower support flange 118 and cam follower 128 etc. will traverse the cam follower 128 about the periphery of cam surface 117 to provide oscillation of pivot shaft 124 to reciprocate the push pin 236 between extreme positions of movement illustrated in FIGS. 11 and 12 to move the rotary cutter knives 186 and 200 between engaged and disengaged positions in timed relationship to the movement of work pieces between the cutter knives by the work piece handling units 150.

The construction of the identical work piece handling units 150 will now be discussed in detail with initial attention being invited to FIG. 6 which illustrates their main components. Primary support for the components is provided by a bushing block 260 having side flanges supported on shoulders 108 and 110 and held in position by threaded pins or the like 264 (FIG. 1). It should be understood that there are two work piece handling units 150 oriented on opposite sides of the main support shaft 51 and each one of which is associated with a removable cutter unit 140.

A cylindrical slide bearing 264 is provided in each of the bushing blocks 260 for supporting a slide sleeve 266 for axial reciprocation therein. A work piece drive shaft 268 is mounted for rotation on bearings 270 internally of sleeve 266. Additionally, a manifold block 272 is sealingly engaged with a central portion of the shaft 268 and includes a circumferential ring-shaped chamber 274 communicating with a radial bore 276 in shaft 268 which has its inner end communicating with an axial bore 278 extending to the outer or left end of shaft 268 as viewed in FIG. 4B. A circular vacuum chuck 280 is mounted on the end of the shaft 268 and has an aperture 282 communicating with the axial bore 278.

A Y-shaped slide plate 300 (FIG. 6) extends forwardly from beneath the lower end of the slide sleeve 266 and includes forward guide plates 302 received in inwardly facing slots 304 of slide bearings 306 mounted on shoulders 104 and 106 of the main shaft 51 (FIG. 6). A stripper ring actuator link 308 extends upwardly from each of the guide plates 302 (only one of which links is illustrated in FIG. 6 for purposes of clarity) and has an open slot 310 at its upper or outer end received on one of the actuator pins 245' of the stripper ring 245 so that reciprocation of the actuator links 308 will move the stripper ring 245 along the work piece positioning pins 244 for a purpose to be discussed.

Timed reciprocation of the slide sleeve 266 and its associated parts including a work piece cradle 312, actuator 308 etc. is achieved by virtue of operation of first and second cam followers 318 and 320 carried by a bracket 330 fixedly connected to the end of sleeve 266 opposite the vacuum chuck 280. The first cam follower roller 318 is keyed to a shaft 332 to which a bevel gear 334 is also fixedly connected. Bevel gear 334 is in mesh with a second bevel gear 336 keyed to the work piece of shaft 268. The surface of roller 318 has a high coefficient of friction and movement of the roller with respect to the side of cam 76 consequently drivingly rotates the roller, shaft 332 and gear 334 to drive the gear 336 and work piece drive shaft 268 and associated vacuum chuck 280. It will be seen that the curvature of cam 76 will shift sleeve 266 etc. inwardly and outwardly of the slide bearing 264 in the bushing block 260 as the main shaft rotates with respect to the fixed cam 76. The two extreme positions of the slide sleeve 266 etc. are illustrated by the upper and lower sleeves in FIG. 4B.

It is necessary that the vacuum chuck 280 be connected to a source of vacuum during a substantial portion of a cycle of operation. Achievement of the foregoing requirement is enabled by the provision of an axial bore 340 extending from the end of the main shaft 51 and communicating with a transverse bore 342 which is plugged at both ends and which communicates with passageways 346 extending between the respective shoulders 108 and 110 on the upper and lower sides of the main shaft 51 as viewed in FIG. 6. The passageways 346 extend upwardly through the bushing block 260 (FIG. 4B) and slide bearing 264 to communicate with an elongated chamber 348 provided in each of the slide bearings 264. A radial bore 350 in sleeve 266 provides communication with the ring-shaped chamber 274 as shown in FIG. 4B.

When the sleeve 266 is in the position of the uppermost sleeve illustrated in FIG. 4B, vacuum introduced through any conventional rotary coupling fitting C to the axial bore 340 is conveyed via elements 340, 342, 346, 348, 350 and 274 to the radiaal bore 276 in drive shaft 268 so as to apply vacuum to axial bore 278 and the aperture 282 on the face of the vacuum chuck 280. However, movement of the sleeve 266 to the right from the position of the upper sleeve illustrated in FIG. 4B to the position illustrated by the lower sleeve 266 in FIG. 4B serves to position the radial bore 350 in sleeve 266 beyond the extent of the elongated chamber 348 in communication with the external atmosphere so as to dissipate any vacuum in the vacuum chuck in an obvious manner.

Work piece 354 comprising cylindrical members closed at one end and having an unfinished opposite end 356 are fed to the preferred embodiment to have the unfinished end 356 neatly cut from the work piece by knives 186 and 200 to provide a resultant end construction to which a top can be subsequently permanently affixed. Means for feeding and discharging the work pieces will now be discussed.

An infeed conveyor 358 (FIGS. 1 and 5) receives the unfinished work pieces 354 from any conventional supply source such as another conveyor or the like. Trimmed and finished work pieces 354' are discharged from the apparatus by a discharge conveyor 360. Support for both the infeed conveyor 358 and the outfeed or discharge conveyor 360 is provided by first and second vertical standards 362 and 364 extending upwardly from the base plate 20 to which their lower ends are connected.

Infeed conveyor 358 includes an upper transverse plate 372 and a lower transverse plate 374 extending between and connected to the vertical standards 362 and 364. Lower guide rails 376 are connected to the lower transverse plate 374 and upper guide rails 378 are connected to the upper transverse plate 372 with a pivot shaft 380 (FIG. 8) extending between the upper rails 378 for pivotally supporting the inner ends of first and second arcuately curved can infeed guide means 382 medially joined by a transverse angle 384 in which an adjustment lug 386 is threadably received. The lower end of the adjustment lug 386 rests upon a fixed stop member 388 on the frame which limits the extent of downward movement of the infeed guide members 382 about pivot shaft 380 in an obvious manner. Side plates 390 and 392 provide a lateral axial positioning of the unfinished work pieces in the form of cans 354 fed downwardly between the rails 376 and 378.

Discharge conveyor 360 is also supported between the vertical standards 362 and 364 and includes lower floating guide rails 394 supported on a transverse plate 396 (FIG. 8) extending between the vertical standards 362 and 364 and having curved outer ends 394'. A plurality of pins 398 are axially positionable in bores in the transverse plate 396 and have their inner ends fixedly connected to the lower guide rails 394. A coil compression spring 399 us provided on each of the pins 398 so that the pins are urged downwardly to hold the rails 394 in the position illustrated in FIG. 8; however, it will be apparent that the lower rails 394 are flexibly supported and are capable of some limited movement as they are engaged by cans fed onto their outer ends.

Discharge conveyor 360 also includes a pair of upper guide rails 400 supported on a transverse plate 402 and have curved outer ends 404. The upper guide rails 400 are similarly flexibly supported by pin and spring members in the saame manner as the lower guide rails 394. Cans received between the rails 400 and 394 are conveyed away from the inventive apparatus to another conveyor or the like as required by the particular manufacturing operation.

Means are provided on the main shaft 51 for removing the lowermost unfinished work piece 354 from the infeed conveyor 358 to be received by the vacuum chuck 280 etc. during the can end trimming operation. Additionally, the same means employed for removing the lowermost can from the infeed conveyor 358 also serves to rapidly eject a finished can 354' from the rotating work support means 312, 280 etc. into the discharge conveyor 360 in a manner to be discussed.

More specifically, parallel finger discs 406 are mounted on each end of mounting blocks 408 which are fixedly connected to the arcuately curved outer edge surface 82' of the central portion 82 of the main shaft 51 as shown in FIG. 6. Each disc of each pair of discs on each mounting block mutually cooperate with each other. The disc pairs are mounted on opposite sides of the main shaft in the central portion 82. Only one pair of discs is illustrated in FIG. 6 for purposes of clarity. Therefore, it will be seen that a total of four finger discs 406 are employed on the shaft 51.

Figures 8, 9:
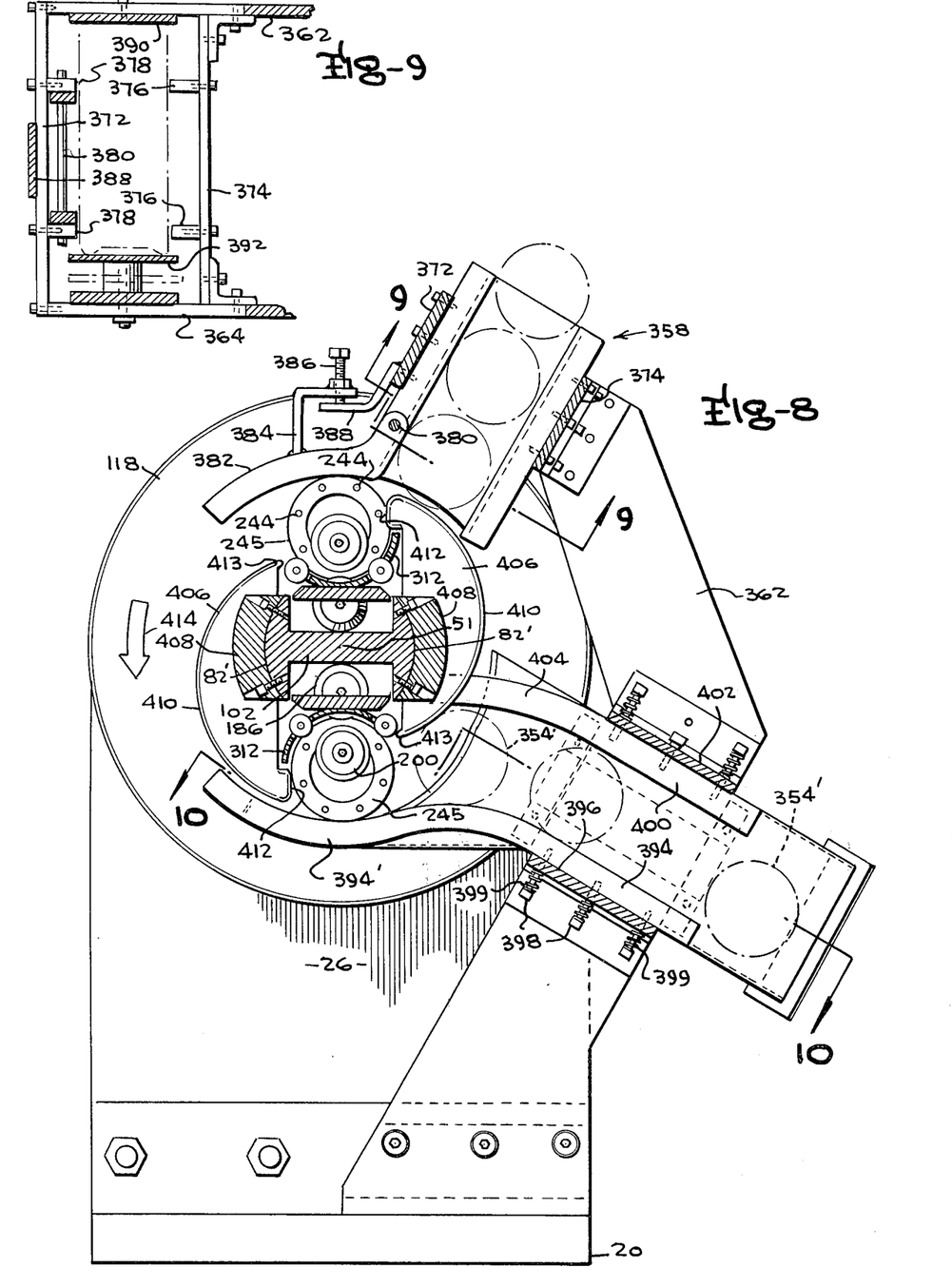
FIG. 8 is a sectional view taken along lines 8—8 of FIG. 4B.
FIG. 9 is a sectional view taken along lines 9—9 of FIG. 8.
Figure 10:
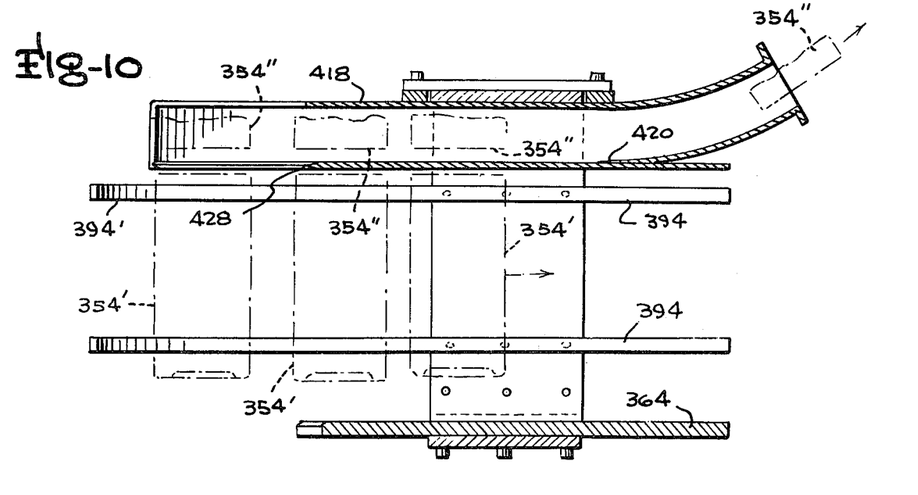
FIG. 10 is a sectional view taken along lines 10—10 of FIG. 8.

FIG. 8 illustrates one finger disc of each of the finger disc pairs. Each finger disc 406 has an arcuately curved outer peripheral surface 410 with the center of curvature of the surfaces 410 for the upper or righthand pair of discs in FIG. 8 being positioned above the axis 51' of the main shaft 51 and the center of curvature of the surfaces 410 of the lower or lefthand disc being positioned below the axis 51' as will be evident from inspection of FIG. 8. Each of the discs 406 includes a leading (as rotated in the direction of arrow 414 in FIG. 8) work piece engaging sufface 412 and a trailing surface 413. It will be noted that the dual function surface 412 will engage the lowermost can in the infeed conveyor 358 to remove that can from the conveyor as the apparatus rotates in the direction of the arrow 414 in FIG. 8 and the same surface 412 also serves to eject the finished can 354' onto the outfeed conveyor 360. It should be noted that the arcuate surface 410 trailing behind the dual function work piece engaging surface 412 serves to prevent the next can in the infeed conveyor from moving from the conveyor unit until such time as the trailing surface 413 has rotated past alignment with the lower end of the infeed conveyor 358.

Additionally, a scrap removal chute 416 having side walls 418 and 420 is positioned adjacent the discharge conveyor for receiving scrap rings 354" trimmed from the can work piece. Side wall 420 has a sharp forward edge 428 for aiding in receipt of the scrap rings 354".

Figure 17:
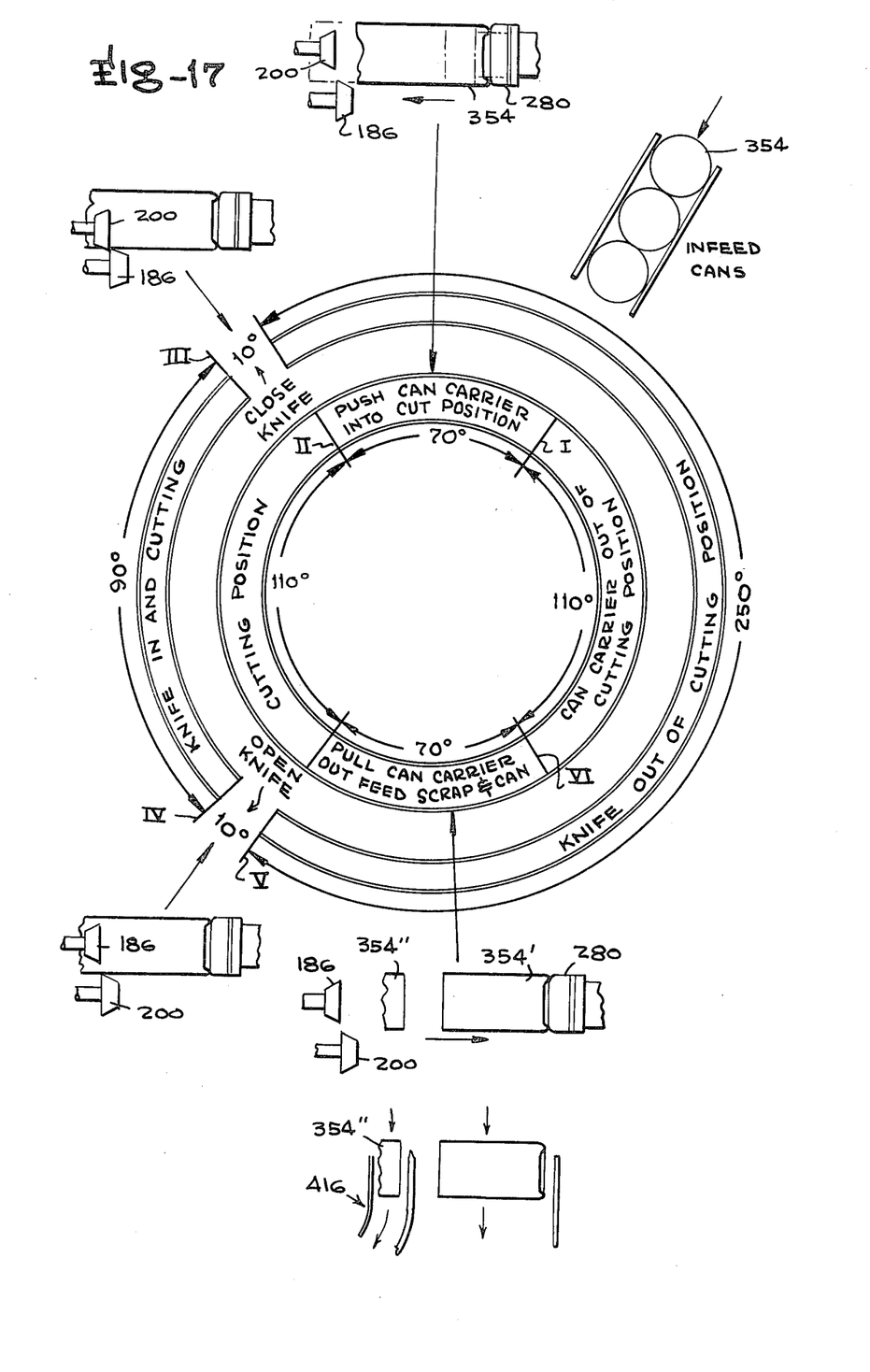
FIG. 17 is a pictorial timing chart illustrating various steps in a cycle of operation of the preferred embodiment.

A complete cycle of operation of the preferred embodiment as illustrated in FIG. 17 will now be discussed with primary reference being to FIGS. 7, 8 and 17. The cycle begins with the elements rotating in the direction of arrow 414 as a lowermost can on the infeed conveyor 358 moves from the trailing portion 413 of the arcuate surface 410 of one pair of finger discs 406 downwardly in front of the following work piece engaging surface 412 of the other pair of finger discs. For reference purposes, various angular positions are illustrated in FIG. 17 with the various positions being designated in roman numerals.

In position I, the surface 412 is engaging the can just deposited on the work piece cradle 312 as discussed above, vacuum chuck 280 is in its retracted position and the aperture 282 is vented to atmosphere with no vacuum being applied thereto. Additionally, in position I, the knife members 186 and 200 are in their open position as shown in FIG. 5 by virtue of the fact that the cam follower 128 is on a high portion of the cam surface 117.

As the apparatus rotates from position I toward position II, continuously rotating vacuum chuck 280 moves forward to position radial bore 350 in communication with the elongated chamber 348 to which a constant vacuum is being applied by previously discussed conduits 340, 346, etc. Consequently, vacuum is supplied to the aperture 282 in the face of the vacuum chuck and the unfinished work piece adjacent the vacuum chuck is pulled into engagement with the face of the chuck to initiate rotation of the can as the chuck continues to move to the left toward the open cutters 186 and 200. Continued movement of the chuck to the left moves the end of the unfinished container 354 into the dotted line position in which the upper cutter knife 200 is positioned on the interior of the unfinished work piece as symbolically illustrated in the uppermost portion of FIG. 15. At the termination of 70° of rotation at position II, the vacuum chuck has moved to its forwardmost position and during the next 10° rotation to position III, the upper knife member 200 is rapidly moved downwardly to the cutting position as illustrated pictorially adjacent angular position III in FIG. 17.

It should be noted at this juncture that FIG. 7 illustrates the upper pair of rotary cutter units 186 and 200 in a closed condition and the lower pair of cutter units in an open condition for purposes of comparitive illustration. In actuality, cutter units in the position of the upper units (the 12 o'clock position) would actually be open as figuratively illustrated in FIG. 17 and the upper cutter member does not move to the lower or closed position until it reaches angular position III in FIG. 17. The upper righthand cam follower 128 illustrated in phantom in FIG. 7 is illustrated in the position that the roller 128 would occupy if the upper cutter member 200 was in the lower or cutting position as illustrated in FIG. 7. In actuality, the roller 128 in the upper righthand portion of FIG. 7 would be riding on the higher part of cam 117 and the cutter member 200 would consequently be in an open position in the same manner as the lower cutter member 200.

Spring 230 must be of substantial size and strength in order to provide effective movement of the cutter member 200 downwardly to the cutting position when the pin 236 etc. is retracted by operation of the cam 128, shaft 124 and cutter actuator arm 134.

An important fact to be kept in mind is that the cutter members 186 and 200 are constantly rotating both in the open and closed positions since the gear teeth or gear members 248 and 196 are of sufficient height to maintain the teeth in mesh when the cutter 200 is in its upper or raised position. Similarly, the vacuum chuck 280 is continuously rotating by virtue of the drive from elements 318, 334, 336 and 268.

Following completion of the closing of the knife members at angular position III, the cutting of the can end is effected during the next 90° of rotation to position IV at which point the cam follower 128 engages rise 117' (FIG. 7) of cam surface 117 to rapidly open the knife members by moving the rotary cutter 200 to the open position as pictorially illustrated adjacent positions IV and V with the opening of the cutter members being completed in approximately 10° of main shaft rotation at position V.

Upon completion of the opening of the knife members, the cam 76 begins retraction of the slide sleeve 266, vacuum chuck 280 and Y-shaped slide plate 300 away from the cutters (to the right as viewed in FIG. 1)

to remove the finished can 354' from its position overlying the positioning pins 244 to clear the can completely from the cutter members and the pins. Additionally, retraction of the slides 300 to the right also results in movement of the stripper ring 245 from the inner position illustrated by the upper stripper ring 245 in FIG. 1 outwardly along the positioning pins 244 to the position illustrated by the lower stripper ring 245 in FIG. 1. Movement of the stripper ring 245 outwardly to the position substantially adjacent the ends of pins 244 results in the stripping of the scrap end 354'' from the pins 244 so that the scrap ends 354'' are discharged into the scrap removal means 416 etc. as shown in FIG. 1 and similarly in FIG. 17.

The retracting movement of the sleeve 266 also eventually results in movement of the bore 350 beyond the end limit of elongated chamber 348 to vent the bore 350 and consequently release the trimmed can 354' from the vacuum chuck 280 as the can reaches a position in alignment with the discharge conveyor 360. The finished can has been discharged and the vacuum chuck 280 etc. is in its completely retracted position illustrated by the lower vacuum chuck in FIG. 4B as the elements reach position VI. The chuck 280 etc. is consequently in position to receive the next can as it subsequently moves into position I.

The employment of the plural cutter units enables a high capacity operation of the preferred embodiment with down time due to cutter failure being kept to a minimum by virtue of the easy replacement of the entire cutter unit in a matter of a few minutes as compared to the prior known devices in which a time consuming substantial disassembly of the components is required in the event of cutter unit failure. It is contemplated that ten or more cutter units could be employed if desired.

Figures 14, 15, 16:
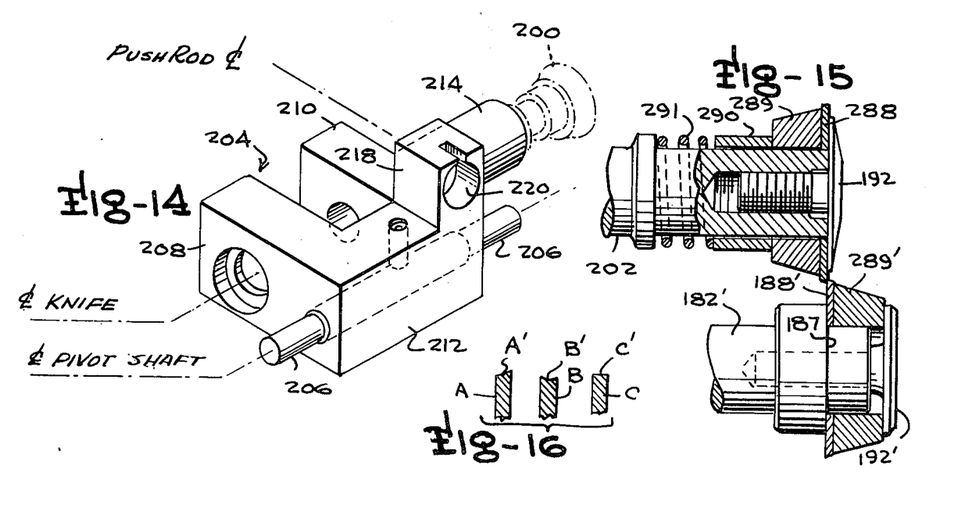
FIG. 14 is a perspective view of a knife support rocker block cutter blade support of the cutter unit.
FIG. 15 is a partial section of an alternate cutter construction.
FIG. 16 is a bisecting section of alternate forms of removable cutter blades usable in the cutter of FIG. 15.

FIG. 15 illustrates modified knife members employing relatively small cutting elements enabling replacement of the cutting surfaces which can be replaced at minimum cost. Specifically, the only difference between the cutter means of FIG. 15 and the previously discussed cutter means comprises the employment of an upper relatively thin cutter disc member 288 mounted between the radial flange of retainer means 192 and biassing means including slidable sleeve member 289 and 290 urged toward the end of the shaft 202 by spring members 291. The shafts 182 and 202 are identical to previously described shaft members 182 and 202 and are consequently provided with the same reference characters as is the retainer means 192. The upper element 289 can be identical to the cutter members 186 and 200 as previously discussed; however, the member 289 in the modification illustrated in FIG. 15 merely serves to bias the cutting discs 288 rather than actually perform a cutting function. Additionally, it should be understood that the cutting discs 288 can be of different diameters if desired so as to be interchangeable as a larger disc is worn down by use and sharpening.

The lower cutting disc 288' is fixedly positioned with respect to the surface 187 by means 192' and 289' in a manner identical to the positioning of member 186 as previously discussed with the only difference being that the cutting surface is provided by the outer edges of the relatively thin cutting disc element 288'.

FIG. 16 illustrates outer edge portions of cutter disc members 288 and 288' (which are structurally identical) employing different outer surface shapes all of which are effective for achieving the cutting function. Disc portion A has a conical outer edge surface A' concentric with respect to the axis of the disc and a shaft on which it is to be mounted. Disc portion B has a concave outer periphery B' and disc portion C has a cylindrical outer periphery C'. It should be noted that each of the disc members provides two cutting edge corner portions defined by the intersection of the planar end surfaces of the disc member with the outer peripheral surfaces.

Figure 18:
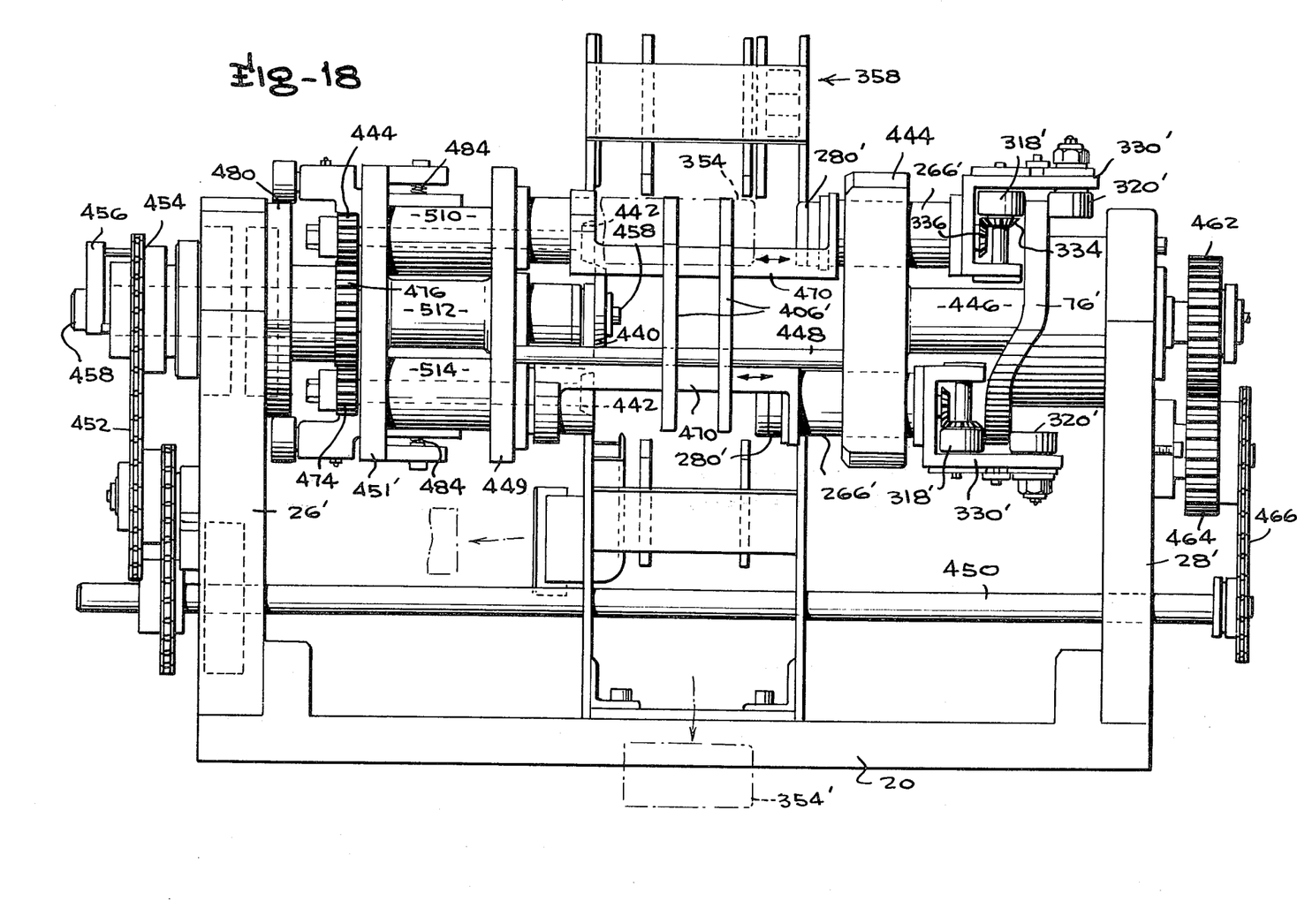
FIG. 18 is a front elevation view of a second embodiment of the invention.

FIG. 18 illustrates a second embodiment of the invention in which a central cutter knife 440 is employed in conjunction with a pair of diametrically opposed planetary cutters 442 which cooperate with the central cutter knife 400 to trim the ends of containers 354. In this embodiment, a base or pillar plate 20' essentially identical to pillar plate 20 provides support for a first vertical support pillar 26' and a second vertical support pillar 28'. A work piece positioning control cam flange 76' is supported on the pillar plate 28' for cooperation with cam followers 318' and 320' associated with a bracket 330' connected to first and second sleeve members 266' supported for reciprocation in a transverse bushing block 444 fixedly mounted on a main shaft 446. Main shaft 446 includes end shaft components supported between the members 26' and 28' by rotary bearing means with a central cage type portion including a plurality of connecting rods 448 drivingly joining the transverse bushing block 444 and a transverse cutter support block 449. Only one of the connecting rods 448 is illustrated in FIG. 16. Block 444 is connected by sleeve members 510, 512 and 514 to a second transverse block 451' connected to the shaft component supported in bearings in member 26'.

Power for the embodiment of FIG. 18 is provided from a main drive shaft 450 driven by an electric motor or other suitable power source in a counter-clockwise direction as viewed from the left end of the main drive shaft 450. All subsequently discussed directions of rotation will be as viewed from the left end of the main drive shaft 450.

Counter-clockwise rotation of drive shaft 450 is conveyed through a step-down transmission to a drive chain 452 drivingly connected to an idler sprocket assembly 454 supported for free rotation adjacent the end of shaft 446. A link 456 connects idler sprocket 454 to the end of a central cutter wheel drive shaft 458 supported for rotation coaxially within the members 446' 449, etc. to drivingly rotate the knife 440.

In operation, main drive shaft 450 is driven in a counter-clockwise direction and subsequently drives knife 440 in a counter-clockwise direction via elements 452, 454, 456 and 458. At the same time, shaft 450 drives shaft 446 in a clockwise direction via gears 462 and 464 and a chain 466. The last-mentioned clockwise rotation is provided to elements 444, 449 and 451 as well as vacuum chucks 280' carried by the members 444 and 449. Permanent work piece cradles 470 extend from sleeve 266' over to the area of the planetary cutters 442 and have stripper rims 472 at their outer extremities for removing the waste rings 354'' from pins surrounding the planetary cutters (not shown) in a manner analogous to the operation of elements 244, 255 of the first embodiment. Additionally, the cage construction between the elements 444 and 449 includes a pair of finger discs 406' supported by the connecting rods 448 etc. for rotation and operation in exactly the same manner as the finger discs 406 of the first embodiment.

Planetary cutters 442 are driven by gear members 474 keyed to the shaft on which the cutter members 442 are mounted and meshing with a sun gear 476 driven in a counter-clockwise direction from central cutter shaft 458. A cutter knife actuating cam 480 is fixed to the vertical support pillar plate 26' and serves the purpose of moving the planetary cutter members 442 radially inwardly and outwardly with respect to the sun cutter 440. This movement is effected by virtue of the fact that the shafts on which the planetary cutters 442 are mounted are capable of inward movement with respect to the central shaft 458 either by the employment of slide bearings in members 449, 451' or by the supporting of the shafts on the end of a pivotal member provided at one end to means connected to elements 449 and 451 and carrying the shaft supporting cutters 442 at an opposite end in a manner of operation analagous to the operation of the pivot block 204 of the first embodiment. In any event, heavy springs 484 urge the cutter members 442 toward a cutting position overlapping the central cutter 440.

In operation, unfinished cans 354 are fed by an infeed conveyor 358 to be engaged by the finger discs 406' and deposited on the cradles 470 in approximately the twelve o'clock position of the cradle members. The vacuum chucks 280' are concurrently moving forwardly and vacuum is applied to the face of the chucks through passageways in member 444 and sleeves 266' to support the work piece for axial rotation caused by member 318' and the bevel gears 334, 336 etc. in a manner essentially identical to the operation of the chuck of the first embodiment. The open can end is moved over the upper cutter 442 adjacent the central cutter 440 since the cutters are in a spaced condition. Operation of cam 480 then moves the upper cutter 442 downwardly in overlapping cutting relation with respect to the cutter 440 so as to trim the scrap ring 364" from the can end. As the cutter unit approaches the 6 o'clock position, the scrap ring has been trimmed from the can end and the vacuum chuck 28', sleeve 266' etc. is moving to the right to release the vacuum in the chuck 280' and discharge the can and the scrap in the same manner as the first embodiment. In the meanwhile, the other container cradle 470 is receiving a new can as the system continues to cycle.

While numerous modifications of the subject invention will undoubtedly occur to those of skill in the art, it should be understood that the spirit and scope of the invention is to be limited solely by the appended claims.

I claim:

1. A can end trimmer apparatus for trimming the open cylindrical end of a cylindrical can having a closed opposite base end, said apparatus comprising a fixed main frame, main shaft means supported for rotation on said fixed main frame, means including a central rotary cutter knife positioned coaxially of said main shaft means, first and second rotary planetary knife members each having a circular cutting edge positioned adjacent said central rotary knife, support means carrying said first and second rotary planetary knife members for orbital movement about said central rotary knife, selectively operable knife actuator means for moving said first and second rotary planetary knife members between a first or cutting knife position in which said circular cutting edges of said rotary planetary knives overlap the cutting edge of the central rotary cutter knife and a second or non-cutting knife position in which said cutting edges are spaced apart and do not overlap, power transmission means drivingly connected to said first and second rotary planetary knives for enabling axial rotation of said planetary knives, drive means for drivingly rotating said main shaft means, a source of power drivingly engaged with said power transmission means when said cutter unit assembly is in said operative position for driving said rotary planetary knife members, can holder means mounted on said main shaft facingly adjacent said cutter means for movement between a first holder position in which a can supported by its base end on said can holder has its open end spaced from said knife members and a second holder position in which the open end of a can on said holder encloses one of said planetary knife members with a portion of the can wall extending between said rotary planetary knife member when said planetary knife is in said second or non-cutting position, cyclically operated knife control means engageable with said knife actuator means for causing said knife actuator to position said second planetary knives in either said first or second knife positions during desired discrete portions of each revolution of said main shaft and cyclically operated can holder positioning means operated in fixed timed relationship with said cyclically operated knife control means for moving said can holder to said second holder position at a time a planetary knife aligned with said holder is in said second or non-cutting knife position and retaining said holder in said second holder position while said aligned planetary knife first moves to said first or cutting knife position to effect cutting of an end portion of any can in the can holder from the remainder of the can and then moves back to said second or non-cutting knife position and for moving said can holder to said first holder position subsequent to said last-mentioned movement of said aligned planetary knife to said second or non-cutting position.

2. The invention of claim 1 wherein said work holder comprises a vacuum chuck, and further including a source of vacuum, valving means normally connecting said source of vacuum to said vacuum chuck to enable the holding of a can in said chuck but disconnecting said source of vacuum from said vacuum chuck in response to positioning to said work holder in or closely near said first holder position.

* * * * *